May 25, 1937.  C. E. BRETNEY  2,081,165
KITCHEN UTENSIL
Filed April 24, 1936

Inventor
Carl E. Bretney
By Haugood Van Horn
his Attorneys

Patented May 25, 1937

2,081,165

UNITED STATES PATENT OFFICE 2,081,165

KITCHEN UTENSIL

Carl E. Bretney, Cleveland, Ohio

Application April 24, 1936, Serial No. 76,243

4 Claims. (Cl. 294—7)

My invention is an improvement in culinary utensils and relates more particularly to utensils of the type more commonly known as cake turners or the like.

An object of my invention is to provide a kitchen utensil which is extremely useful in turning pancakes, eggs or other articles of food in a frying pan or skillet, and removing the same therefrom.

Another object of the invention is to provide a utensil of this class which is so constructed that it offers less interference with the upstanding walls of a pan or skillet than is now encountered in the conventional type of utensil having a straight handle, or one lying in a plane intersecting the plane of the blade.

A further object of the invention is to construct a kitchen utensil which is provided with a blade and a handle, but in which a portion of the handle is formed so that it will lie in a plane in substantially spaced parallel relation to the plane of the blade.

Other objects and advantages of my invention will become more apparent from the following description of two embodiments thereof, reference being made to the accompanying drawing, in which like reference characters are employed to designate like parts throughout the same.

In the drawing—

Kitchen utensils of the type such as pancake turners have heretofore been constructed to include a flat blade to be inserted under the pancake and an elongated handle extending either in the plane of the blade throughout the extent of the handle, or a handle which is disposed throughout its length at an angle to the blade.

While the latter type is perhaps preferable to the former so far as ease of handling is concerned, even the latter type does not possess the advantages of a device constructed in accordance with my invention.

Figure 1:
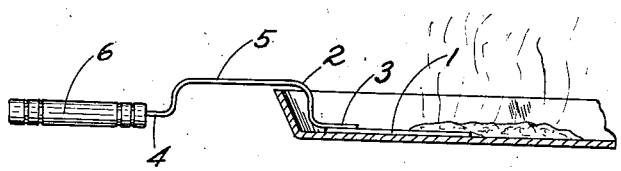
Figure 1 is an elevation of one embodiment of my invention shown in use.
Figure 2:
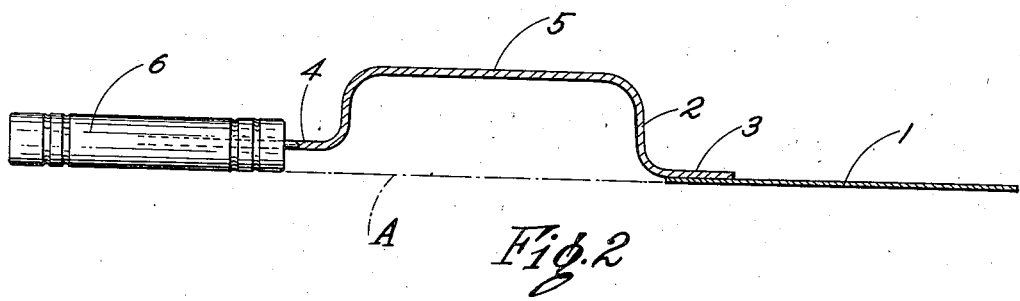
Figure 2 is a longitudinal section through the same.

By my invention, as illustrated by one embodiment in Figures 1 and 2, I provide a blade 1 of sheet metal which is preferably formed by stamping it from stock of suitable thickness to impart some flexibility and rigidity to the blade. The handle 2 is formed from a strip of metal of desirable width and thickness and comprises flat opposite end portions 3 and 4 lying in opposite directions in the same plane, and an intermediate portion 5 formed to lie principally in a plane spaced from, but substantially parallel to, the plane of the ends 3 and 4.

A grip 6 of wood, fiber, plastic, or other suitable material is preferably telescoped over one of the flat handle ends 4, while the other end 3 of the handle is secured to the blade 1 by welding or by rivets.

Figure 3:
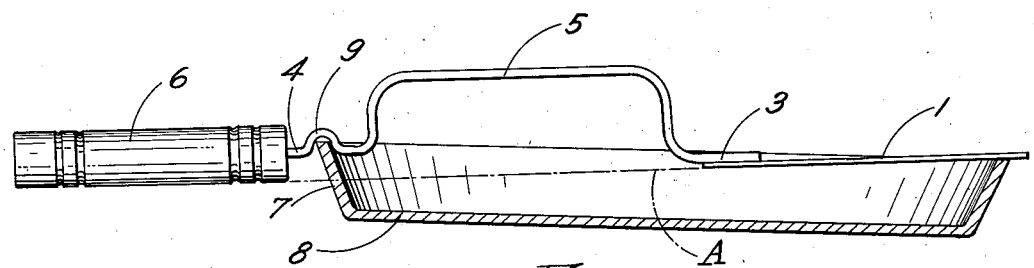
Figure 3 is a side elevation of a second embodiment showing the same supported on a frying pan or skillet.

It is to be noted that the bottom of the handle 6 and the under face of the blade 1 lie in substantially the same plane represented by the broken line A in Figure 2. This permits the utensil and particularly the blade 1 to lie flat upon a plane surface when the tool is not in use. Also it will be noted that the portion 4 of the handle is above the plane of the blade 1. In this manner the device may be supported upon the upper rim 7 of a frying pan or skillet 8 as shown in Figure 3, so that the device will assume an inclined position when the points of support on the rim are the blade 1 and the handle portion 4. Thus hot grease may the more readily be drained from the blade 1 back into the pan 8.

In Figure 3 I have illustrated a modification of my invention which consists in forming a partial loop or depression in the handle portion 4 as at 9 to receive the edge of the rim 7 as shown in the drawing. In this manner the device may be supported on the rim of the pan at diametrically opposite points on the rim with less danger of being accidentally dislodged.

In both forms of my invention as illustrated in the drawing I have provided a very useful and convenient kitchen utensil, and by forming the handle into a substantially inverted U-shape, the user is enabled to more effectively apply the blade 1 under a pancake or other article of food in the pan to turn or remove the same, because in forming the handle in this manner a direct horizontal force may be applied to the handle and blade without interference from the rim 7 of the pan. Therefore, it is not necessary to supply a blade which is possessed of sufficient flexibility to bend in order to be inserted under the article of food in the pan. The usual custom heretofore has been to attach the handle and blade at an obtuse angle in order to avoid interference with the rim of the pan in use. By my invention, I have eliminated these practices, and have provided a kitchen utensil of simple and durable construction which is extremely easy to use.

Various changes may be made in the details of construction without departing from the spirit of my invention or the scope of the appended claims.

I claim:—

1. A kitchen utensil comprising a flat blade, a handle attached at one end to the blade and a grip on the handle, the under faces of the grip and the blade lying in substantially the same plane, said handle having a portion intermediate the grip and blade formed to substantial U-shape, whereby the yoke of the U-shaped portion is rendered free from contact with the side wall of a cooking vessel in use lying in a plane substantially parallel to the plane of the blade.

2. A kitchen utensil comprising a flat blade, a handle attached at one end to the blade and a grip on the handle, the under faces of the grip and the blade lying in substantially the same plane, said handle having a portion intermediate the grip and blade lying in a plane substantially parallel to the plane of the blade, said intermediate portion having a recess formed therein to receive the rim of a pan or the like.

3. A kitchen utensil comprising a flat blade, a handle attached at one end to the blade and a grip on the handle, the under faces of the grip and the blade lying in substantially the same plane, said handle having a portion intermediate the grip and blade lying in a plane substantially parallel to the plane of the blade, said intermediate portion of the handle being formed to receive an edge of the rim of a pan or the like and to thereby prevent longitudinal relative movement between a pan and the utensil.

4. A cake turner comprising a blade and a handle therefor, said handle being formed intermediate its ends into a substantially inverted U-shape, the yoke of the U-shaped portion of the handle lying in a plane substantially parallel to the plane of the blade and sufficiently removed from the plane of the blade to avoid contact with a side wall of a pan in use.

CARL E. BRETNEY.

CERTIFICATE OF CORRECTION.

Patent No. 2,081,165.  May 25, 1937.

CARL E. BRETNEY.

It is hereby certified that error appears in the printed specification of the above numbered patent requiring correction as follows: Page 2, first column, line 12-13, claim 1, strike out the words "lying in a plane substantially parallel to the plane of the blade"; and that the said Letters Patent should be read with this correction therein that the same may conform to the record of the case in the Patent Office.

Signed and sealed this 24th day of August, A. D. 1937.

(Seal)

Leslie Frazer
Acting Commissioner of Patents.